United States Patent [19]

Smialek et al.

[11] Patent Number: 4,535,035

[45] Date of Patent: Aug. 13, 1985

[54] OXIDATION RESISTANT SLURRY COATING FOR CARBON-BASED MATERIALS

[75] Inventors: James L. Smialek; George C. Rybicki, both of Strongsville, Ohio

[73] Assignee: The United States of America as represented by the Administrator of the National Aeronautics and Space Administration, Washington, D.C.

[21] Appl. No.: 571,617

[22] Filed: Jan. 17, 1984

[51] Int. Cl.$^3$ .............................................. B05D 3/02
[52] U.S. Cl. .................................... 428/698; 427/191; 427/228; 427/294; 427/376.2; 427/380; 427/397.7; 428/704
[58] Field of Search ............ 427/228, 380, 294, 376.2, 427/191, 397.7; 428/704, 698

[56] References Cited

U.S. PATENT DOCUMENTS

| | | | |
|---|---|---|---|
| 2,929,741 | 3/1960 | Steinberg | 117/114 |
| 3,140,193 | 7/1964 | Kane | 427/294 |
| 3,265,528 | 8/1966 | Bond | 427/294 |
| 3,275,471 | 9/1966 | Lowell et al. | 117/169 |
| 3,356,525 | 12/1967 | Gutzeit | 427/228 |
| 3,385,723 | 5/1968 | Pickar | 427/294 |
| 3,540,863 | 11/1970 | Priceman et al. | 29/191.2 |
| 3,619,430 | 11/1971 | Hiratsuka et al. | 427/294 |
| 4,088,479 | 5/1978 | Spengler | 75/171 |
| 4,092,459 | 5/1978 | Deffeyes et al. | 427/228 |

FOREIGN PATENT DOCUMENTS

| | | | |
|---|---|---|---|
| 0145180 | 11/1981 | Japan | 427/228 |
| 0064372 | 4/1983 | Japan | 427/228 |

*Primary Examiner*—Michael R. Lusignan
*Assistant Examiner*—Janyce A. Bell
*Attorney, Agent, or Firm*—Gene E. Shook; John R. Manning

[57] ABSTRACT

An oxidation resistant coating is produced on carbon-base materials, and the same processing step effects an infiltration of the substrate with silicon containing material. The process comprises making a slurry of nickel and silicon powders in a nitrocellulose lacquer, spraying onto the graphite or carbon-carbon substrate, and sintering in vacuum to form a fused coating that wets and covers the surface as well as penetrates into the pores of the substrate.

Optimum wetting and infiltration occurs in the range of Ni-60 w/o Si to Ni-90 w/o Si with deposited thicknesses of 25–100 mg/cm$^2$. Sintering temperatures of about 1200° C. to about 1400° C. are used, depending on the melting point of the specific coating composition.

The sintered coating results in Ni-Si intermetallic phases and SiC, both of which are highly oxidation resistant. The final coating composition can be further controlled by the length of the sintering time.

5 Claims, 3 Drawing Figures

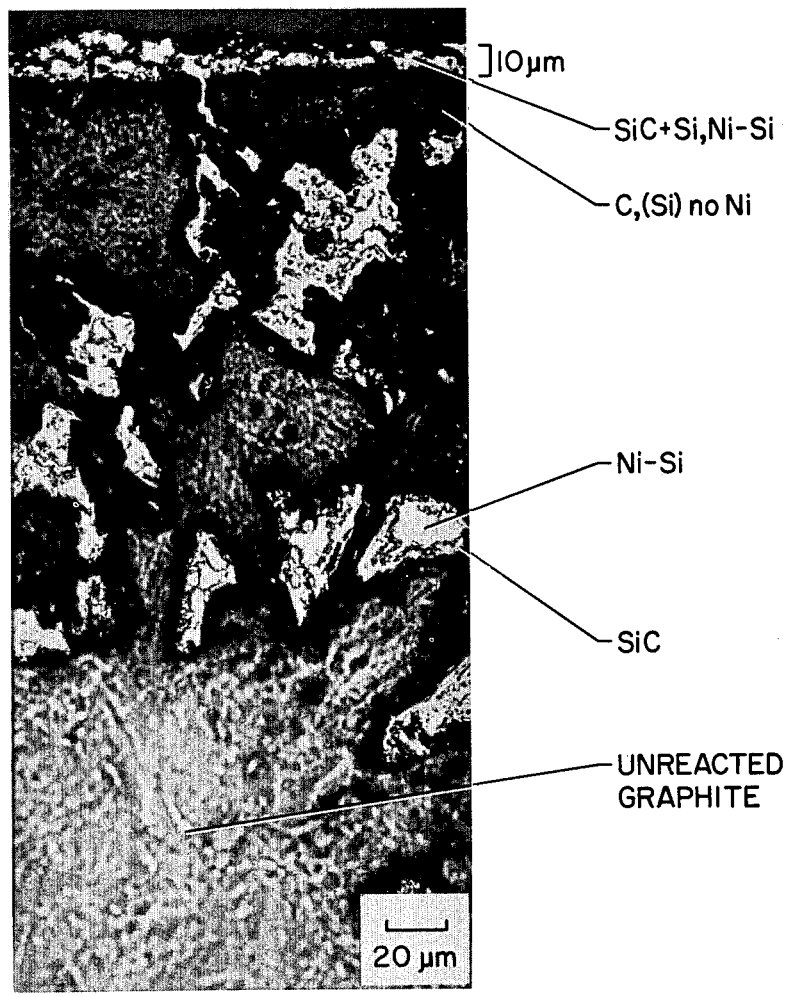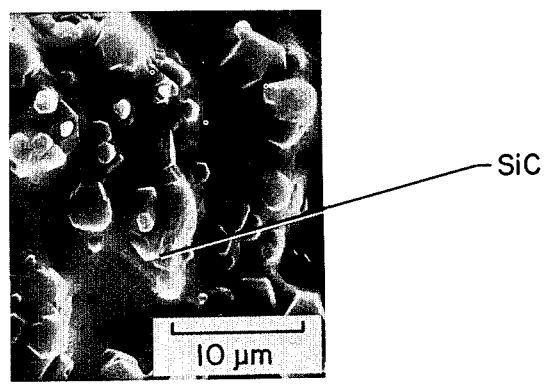

OXIDATION RESISTANT SLURRY COATING FOR CARBON-BASED MATERIALS

ORIGIN OF THE INVENTION

The invention described herein was made by employees of the U.S. Government and may be manufactured and used by or for the Government for governmental purposes without the payment of any royalties thereon or therefor.

TECHNICAL FIELD

This invention is directed to inhibiting the decomposition of carbon-base materials during high temperature exposure to air. The invention is particularly concerned with an improved coating for protecting these materials.

Coated carbon composite materials are used as heat shields for the space shuttle nose cap and wing leading edges. These carbon-carbon composites are also being considered for various high temperature components of aircraft turbine engines, such as turbine blades, vanes, and nozzle liners. The major advantage of these materials is their very high strength-to-weight ratios at temperatures between 1200° C. to 2000° C.

One major disadvantage of carbon-base materials is their extremely high oxidation rate. Conventional methods of protecting graphite and carbon-carbon composites generally consist of coating the material with a silicon carbide by chemical vapor deposition or pack cementation processes. A second step or series of steps may follow in which the coating cracks are infiltrated with an organic liquid containing silicon, such as tetraethylorthosilicate, and fired to form a crack sealing silica glass. Other processes, referred to as inhibition, are used to impregnate the carbon material with silicon containing materials and provide some measure of oxidation resistance to the base material itself prior to overcoating with SiC.

At high temperatures the silicon carbide coating reacts with oxygen in air to form a protective film of silicon dioxide. Therefore, the purpose of the overcoat is to provide silicon to take part in this reaction and protect the exterior of the engine component. Such coatings provide adequate protection above 1200° C. where a fluid $SiO_2$ glass is formed as a protective oxide.

At lower temperatures, cracks are formed in the SiC coating by thermal cycling and thermal expansion mismatch with the carbon. Direct oxygen attack of the interior of the component results because of a lack of sealing ability of the $SiO_2$ glass due to its high viscosity.

Catastrophic lower temperature oxidation of these substrates is common. Therefore, some additional protection is required from the silicon infiltrated during processing. This is especially true at intermediate temperatures from 800° C. to 1200° C. where the $SiO_2$ film cannot flow to seal the coating cracks.

It is apparent that prior art methods are not totally satisfactory because the cracks in the coating eventually result in a direct attack of the component interior. Also, two separate processes are required to provide exterior and some interior protection.

It is, therefore, an object of the present invention to provide an improved process for producing an oxidation resistant coating on a carbon-based material and, in the same processing steps, effect an infiltration of the material with silicon-containing material.

BACKGROUND ART

U.S. Pat. No. 3,375,471 to Lowell et al. discloses a method of preparing an oxidation resistant article. A Si+SiC coating is produced on graphite by slurry coating or dipping. The coating is then fast-fired at 1415° C. to 1500° C.

DISCLOSURE OF INVENTION

The present invention is directed to an improved method of producing an oxidation resistant coating on a carbon-based substrate. The same processing step effects an infiltration of the substrate with silicon-containing material and provides a fused coating. The process utilizes a slurry of nickel and silicon powders in a nitrocellulose lacquer. This slurry is applied to a carbon-carbon or graphite substrate in a single spraying operation.

After drying in air the coated substrate is fired in a single operation below 1400° C. Vacuum sintering between about 1200° C. and about 1400° C. at $10^{-5}$ torr has been successful in producing a coating which melted, wet, and infiltrated the substrate.

BRIEF DESCRIPTION OF THE DRAWING

The objects, advantages and novel features of the invention will be more fully apparent from the following detailed description when read in connection with the accompanying drawing wherein FIG. 1 is a 500 magnification micrograph showing the distribution of phases in the cross section of an ATJ graphite substrate coated with a Ni-70 Si fused slurry;

FIG. 2 is a 3000 magnification micrograph from a scanning electron microscope showing SiC crystallites in a Ni-70 Si coating sintered by a two-step process of 1200° C. for one hour followed by 1325° C. for one hour.

BEST MODE FOR CARRYING OUT THE INVENTION

Figure 3:
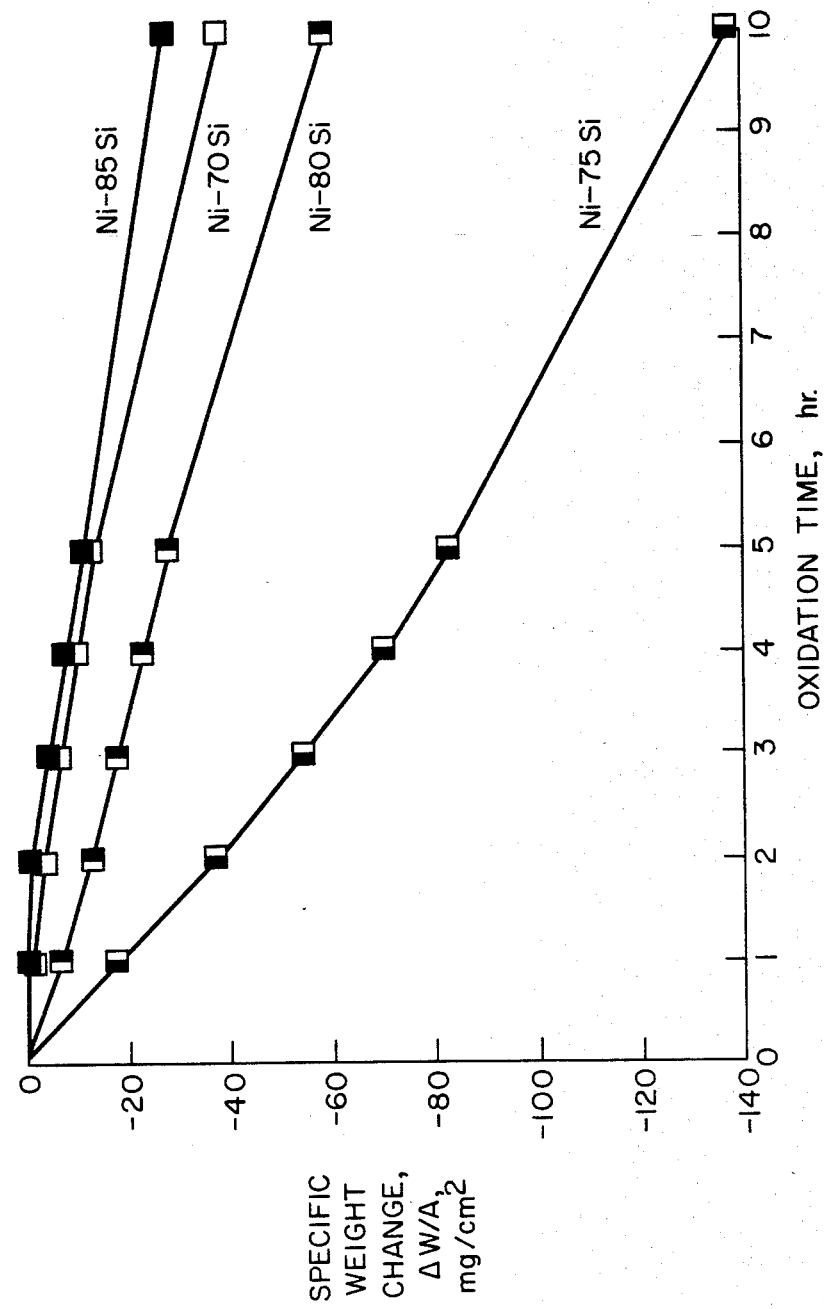
FIG. 3 is a graph showing compositional effects on 1200° C. cyclic oxidation behavior of coatings sintered by a two-step process of 1200° C. for one hour followed by 1325° C. for one hour.

In order to illustrate the beneficial technical effect of the improved coating, a number of ATJ graphite coupons were coated in accordance with the present invention. Each coupon was 0.25×1.25×2.50 cm. The graphite of the coupon substrates was about 73% dense and exhibited a substantial amount of large porosity.

A slurry of nickel and silicon powders in a nitrocellulose lacquer was prepared. The powders were about $-325$ mesh.

The slurry was sprayed onto the surface of each coupon. Optimum coverage and infiltration occurred in the range of Ni-60 w/o Si to Ni-90 w/o Si. The coatings were deposited to thicknesses of about 25-100 mg/cm². The slurry was sprayed using a conventional paint sprayer in air, and the coated coupons were air dried.

The coated coupons were placed in a furnace which was evacuated to $10^{-5}$ torr. The coupons were then vacuum-sintered between about 1200° C. to about 1400° C. for a time period of up to three hours. The coupons were sintered either while resting on an aluminum oxide plate or while suspended from aluminum oxide hangar rods.

The sintered coatings produced Ni-Si intermetallic phases and SiC, both of which are highly oxidation resistant. A cross section of a SiC+Si reaction zone of a coating that was processed at 1325° C. for five minutes is shown in FIG. 1. This micrograph shows an intact area of the coating after oxidation at 1200° C. for five hours. The coating has penetrated pores, and the outer layer has protected the unreacted graphite. FIG. 1 illustrates the assintered coating structure and phases as well.

Referring to FIG. 1 in greater detail, an outer 10 $\mu$m layer of substantially continuous and uniform SiC, Ni-Si, and Si coating is apparent. The pores near the surface have been filled with a liquid Ni-Si phase to a depth of about 180 $\mu$m. The external layer and the filled pores of both these areas show some internal structures which are probably SiC precipitates. A microprobe study of these areas showed high levels of Ni in the penetrated pores with amounts of Si consistent with the formula for $Ni_2Si$. In this phase the carbon content was very low. In adjacent phases the Si and C contents were more consistent with SiC, and the Ni content was low. The dark areas between the filled pores showed only C with a trace of Si and no Ni.

A two-step sintering process produced optimum results in terms of wetting, flow, and uniformity. A 1200° C./1 hr+1200° C./1 hr sample contained a relatively large amount of the Ni-Si compounds compared to coatings sintered in a single step. A 1200° C./1 hr+1325° C./1 hr sample indicated a major decrease in the amount of the metallic phase, and a corresponding increase in the SiC phase. A 1200° C./1 hr+1450° C./1 hr sample indicated again a large amount of Ni-Si compounds which is consistent with the observed remelting and lack of SiC crystallites at the surface.

The surfaces of the Ni-70 Si coating sintered by a 1200° C./1 hr +1325° C./1 hr two-step process is shown in FIG. 2. These sintering temperatures produced a fused outer coating of Ni-Si compounds decorated with small crystals of SiC. The sample shown in FIG. 2 appeared rough at low magnifications, and it had the highest concentration of SiC crystals at the surface of any sample. This coating did not exhibit any cracks, as opposed to two other coupons that were sintered at 1200° C./1 hr+1200° C./1 hr and 1200° C./1 hr+1450° C./1 hr which had numerous cracks, spaced 100 $\mu$m apart.

It is apparent from the micrographs in FIGS. 1 and 2 that superior protection of the component is achieved at intermediate temperatures. The process is less costly than conventional methods inasmuch as it requires only a paint sprayer and a vacuum furnace. Conventional systems require a chemical vapor deposition reaction chamber, or pack cementation, often followed by a multistep impregnation process.

The oxidation behavior graph of FIG. 3 shows the high Si content coatings to be the most protective. The uniform appearance of these specimens indicated that they did not degrade in the localized defect mode as did other coatings. The 75 percent Si coating was generally yellow-gray throughout the oxidation test. The 80 percent Si began as blue-gray and became slightly tan at 10 hours. The 85 percent Si began as a very dark charcoal grey, changing to a slightly blue-green tint at 10 hours.

It is apparent from FIG. 3 that the 70 percent Si coating, the 80 percent Si coating, and the 85 percent Si coating exhibited the best protection. The reason for the behavior of the 75 percent Si coating is not known, although the major difference in microstructure from a fused metallic luster to a matte sintered surface occurs at about 70 percent to about 75 percent Si.

The improved results obtained by the coating of the present invention for carbon components are achieved because the Ni-Si alloys have good melting, flow, and wetting characteristics on carbon. These characteristics were not previously recognized. Therefore, the fused coatings of the present invention provide both infiltration as well as surface coverage. The coatings also react with the carbon substrate to form SiC which is oxidation resistant, as are the Ni-Si intermetallic compounds that are in the sintered coating. It is also apparent that the coatings of the present invention do not crack as extensively as chemically vapor deposited, or pack cementation SiC coatings. Therefore, the coatings of the present invention have the potential for greater protection from oxidation.

While the preferred embodiment of the invention has been disclosed it will be appreciated that various modifications may be made to the invention without departing from the spirit thereof or the scope of the subjoined claims. For example, glass powders may be easily incorporated into the slurry. These powders have the potential for melting and sealing any cracks subsequently formed in the coating. Other transition elements besides or in addition to Ni can be used to form eutectic melts with Si to produce fused coatings on carbon-base materials. Examples would be Fe, Cr, Co, etc. which could operate according to the same principles described above for Ni-Si coatings.

It is contemplated that the process may also be altered to include other metallic elements, such as chromium and aluminum, which together have been found to form protective $Al_2O_3$ scales on NiCrAl alloys. Therefore, by the application of a fused NiCrAlSi alloy slurry coating, a carbon substrate may be protected by other oxide films, even though the low melting Ni-Si eutectic temperature is still utilized.

We claim:

1. A method of inhibiting the decomposition of a carbon-base material during high temperature exposure to air comprising the steps of preparing a slurry of nickel powders and silicon powders containing about 60 w/o to about 90 w/o silicon in a nitrocellulose lacquer, spraying said slurry onto a surface of the carbon-base material to a thickness between about 25 mg/cm$^2$ to about 100 mg/cm$^2$ in an air environment to coat the same, drying the coated carbon-base material in air, and vacuum-sintering the coated carbon-base material at 1200° C. for one hour and then vacuum sintering at 1325° C. for one hour.

2. A method of coating a carbon-base material comprising the steps of spraying a slurry containing nickel powders and silicon powders onto said carbon-base material in an air environment, placing said slurry covered carbon-base material in a vacuum, and sintering said slurry covered carbon-base material in said vacuum by heating the same to 1200° C. for one hour and then heating said slurry covered carbon-base material to 1325° C. for one hour.

3. A method as claimed in claim 2 wherein the slurry contains about 60 w/o to about 90 w/o silicon in a nitrocellulose lacquer.

4. A method as claimed in claim 2 wherein the carbon-base material is covered with the nickel-silicon slurry to a thickness between about 25 mg/cm$^2$ to about 100 mg/cm$^2$.

5. A carbon-base material coated in accordance with the method of claim 2.

* * * * *